April 1, 1958 J. J. COLEMAN ET AL 2,829,188
DEFERRED-ACTION BATTERY
Filed Dec. 5, 1955

Inventors,
Joseph J. Coleman
and Harrison M. McDonald
By: Jones, Jesch & Darbo,
Attys.

United States Patent Office 2,829,188
Patented Apr. 1, 1958

2,829,188

DEFERRED-ACTION BATTERY

Joseph J. Coleman and Harrison M. McDonald, Freeport, Ill., assignors to Burgess Battery Company, Freeport, Ill., a corporation of Delaware Application December 5, 1955, Serial No. 551,000

8 Claims. (Cl. 136—90)

This invention relates to electric batteries and particularly to a deferred-action battery which is activated quickly when it is desired to place the battery in operation. The invention also relates to a deferred-action battery of the character described which is adapted to be activated by being placed in contact with a body of activating liquid as by being immersed in such body.

In the use of deferred-action batteries at sea and elsewhere for supplying power to distress and other signalling apparatus, it is desirable that the battery be activated quickly and completely to its full energy-delivering power in order that the apparatus be fully operative at once. Batteries of this character are frequently activated by being immersed in a body of activating liquid and continue to operate in the immersed position. With such operation, it is also desirable that the activating liquid be prevented from forming short circuits between the cells of the battery.

It is an object of the invention to provide a deferred-action battery which is activated and brought to its full energy-delivering power very quickly upon being placed in contact with the activating liquid.

It is another object to provide a deferred-action battery of the character described which is adapted to be activated by being immersed in a body of activating liquid and to continue to operate while so immersed, in which battery means are provided for preventing short circuiting between cells by the activating liquid.

Further objects and advantages will be evident from the following description in which several embodiments of the deferred-action battery of the invention are described.

Figure 1:
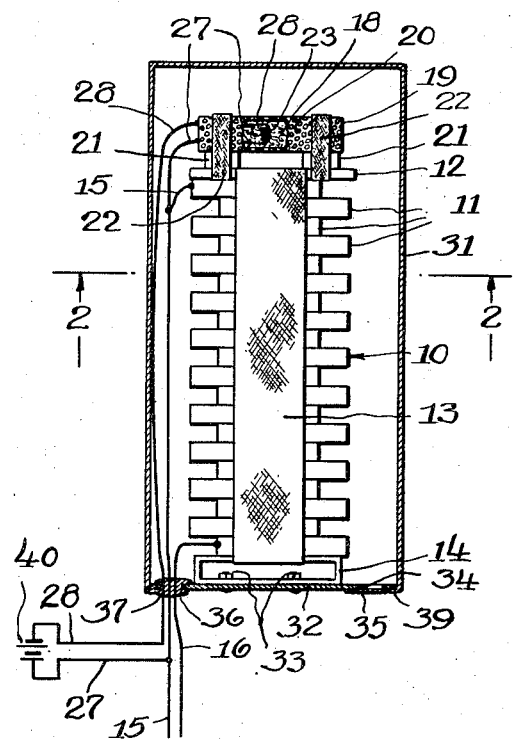
Fig. 1 is a vertical sectional view of one embodiment of the deferred-action battery of the invention.
Figure 2:
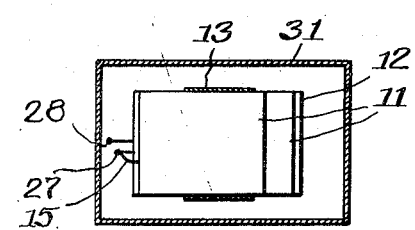
Fig. 2 is a sectional view along line 2—2 of Fig. 1.

In the embodiment of Figs. 1 and 2, the battery 10 is composed of a plurality of flat cells 11 which are stacked together and connected in series. Said battery is similar to the battery which is disclosed in United States Patent No. 2,637,756. The details of the structure of the battery and the cells will not be given herein, but reference is made to said Patent No. 2,637,756, for such details. Briefly, each cell comprises a pair of thin flat positive and negative electrodes with a porous, absorbent, electrolyte-receptive element between them. The cells 11 are individually of rectangular wafer shape and are enclosed upon the sides and edges thereof by an insulating liquid-impervious wrapper, leaving the two opposite ends open to the surrounding space. Small openings are provided in the insulating wrappers through which the cells are electrically connected together in series. Each succeeding cell is offset lengthwise thereof in the opposite direction with respect to the last whereby a staggered succession of cells is formed in which the open ends of each cell are spaced a substantial distance from the open ends of the adjacent cells. At the top end of the stack of cells is a flat slab or plate 12 of insulating material, such as hard fiber, synthetic resin, etc., and at the bottom end is a flat-surfaced rectangular hollow frame 14 of similar insulating material, the purpose of which will be described hereinafter. Encircling the stack of cells, the insulating plate 12 and the upper side member of frame 14 and holding said stack assembled under compression is the insulating adhesive tape 13. Battery terminal conductors 15 and 16 are connected to the end cells.

Fastened to the insulating plate 12 is a mass of combustible material 18, a suitable material being a rapidly combustible substance such as nitrocellulose. Material 18 is contained in perforated envelope or wrapper 19, said envelope being composed of a non-conductive material such as electrical insulating tape.

The envelope is perforated to the extent that the openings 20 occupy 50 percent or more of the wall area thereof. The envelope 19 is supported upon and spaced away from the battery and plate 12 by a pair of blocks 21 of insulating material, such as wood, synthetic resin, etc. Envelope 19 is fastened to the plate 12 by a pair of adhesive tapes 22 which encircle the plate 12, blocks 21 and the envelope. Arranged within the mass of the combustible material 18 is an electrical heating coil 23. A pair of conductors 27 and 28 are connected to said heating coil and pass through the wall of envelope 19.

The assembly which has been described is held within the container 31 composed of a suitable material such as metal. Container 31 is of the same general rectangular shape as is the battery 10, and is sufficiently larger than said battery to provide space within the container surrounding the battery. Container 31 has a cover 32 at the bottom end thereof. Initially, container 31 is open at said bottom end and cover 32 is not in place. The assembly of battery 10 and associated parts which has been described is mounted upon the interior surface of said cover 32. To accomplish this, the lower side member of the rectangular frame 13 is fastened to said cover 32 by the bolts 33 and the openings for said bolts may be sealed by covering the heads of the bolts and the surrounding surface of cover 32 with a molten thermoplastic sealing material such as asphalt or microcrystalline wax and allowing the material to solidify.

Cover 32 has an opening 34 therein, and there is applied to the exterior surface of said cover so as to close opening 34 a rupturable diaphragm 35 composed of suitable sheet material such as aluminum foil, lead foil, thin sheet glass, or the like, said diaphragm being joined to cover 32 by means of a suitable adhesive such as asphalt, microcrystalline wax, or the like. The purposes and operation of rupturable diaphragm 35 will be described hereinafter.

Cover 32 has a second opening 36 therein and before said cover is applied to container 31 the conductors 15, 16, 27 and 28 are led through said opening and the remaining space within the opening is closed by a suitable sealing material 37 such as asphalt, thermoplastic synthetic resin, or the like. After the battery 10 has been mounted on cover 32 and the conductors brought out through opening 36 and the rupturable diaphragm 35 applied to opening 34, the cover 32 is inserted with the battery foremost in the open end of container 31 and the end portion of said container is turned inwardly to form a flange 39, and said flange is attached to the cover to form a gas-tight joint therewith around the circumference of the container, by means of a suitable sealing composition such as solder, asphalt, microcrystalline wax, or the like. At the exterior of cover 32, conductors 27 and 28 are adapted to be connected to the energizing source for the heating coil 23, and conductors 15 and 16 are adapted to be connected to the load circuit of battery 10.

When it is desired to place the battery in operation, the conductors 15 and 16 are connected to the load circuit and the container 31 is submerged with bottom 32 downward in a body of activating liquid. Container 31 is usually fastened to floating apparatus (not shown) which maintains said container submerged or with at least the lower portion thereof submerged. At this time, a suitable source of electrical energy such as battery 40 is connected to conductors 27 and 28, thereby energizing the heating coil 23 and causing ignition and burning of combustible material 18. Heating and hot gases of combustion, principally carbon dioxide, are thereby generated, which cause expansion of the air and gases of combustion in container 31, which is accompanied by increased pressure in said container and rupture of the diaphragm 35. Such rupture is followed by expulsion of a large proportion of the hot gases under pressure from container 31. The heating is followed by cooling with resulting severe contraction of the gases and partial evacuation of the interior of container 31. The interiors of cells 11 are in free communication with the interior of container 31, whereby said cell interiors are also partially evacuated in the action which has been described.

As has been explained, the opening 34 is during this time submerged in the body of activating liquid, and activating liquid is drawn into the interior of container 31 and the interiors of the cells 11 by the said partially evacuated condition thereof. The cells are thereby activated more quickly than they would be if the described means for quick activation were not provided and the container 31 were merely open to the activating liquid as by omitting the rupturable diaphragm 35 and activation were by simply submerging the bottom of the container in the body of activating liquid. Not only are the cells activated much more quickly by the means which have been described, but they are activated much more thoroughly in that the electrolyte-receptive elements of the cells are completely and thoroughly moistened with the activating liquid. As a result of the thorough activation, all of the available area of the electrode is rendered active, and the battery develops its full energy-delivering power. The described evacuation takes place rapidly and with container 31 in submerged condition, the activating liquid rushes into opening 34. A clear space is provided above said opening as shown in Fig. 1, whereby the activating liquid freely rises and quickly activates all of the cells including the topmost cell.

Any suitable activating liquid may be used for the battery of the present invention. The battery described in U. S. Patent No. 2,637,756 is adapted to be activated by plain water or a dilute aqueous solution of sodium chloride, the salt water of the ocean being suitable. As stated hereinbefore, the quick-activating battery of the present invention is especially adapted for furnishing energy to distress or other signalling apparatus used at sea, and is adapted to be activated by immersion in the sea. It has been stated hereinbefore that the load circuit is connected to the terminals 16 and 38 before the battery 10 is activated and this is the preferred procedure. However, the load circuit may be connected after activation if desired.

As stated heretofore, the battery of the invention is adapted to be operated while submerged in a body of activating liquid, and constructed so as to prevent the activating liquid from causing short circuits between cells during operation. The battery of the invention, as exemplified by that disclosed in U. S. Patent 2,637,756, generates gases during discharge and such gases, being less dense than the activating liquid, collect in the upper portion of container 31 and as they increase in volume cause the expulsion of activating liquid from the container 31 through opening 34, and prevent the inflow of liquid. The activating liquid is not expelled from the electrolyte-receptive elements of the cells 11 because such elements are composed of a porous material such as blotting paper which retains the activating liquid against the expelling action of the gas. The expulsion of activating liquid fom container 31 results in the avoidance of short circuits which would otherwise take place between different cells through the activating liquid. In order for the expulsion of activating liquid to be effective for such purpose, the opening 34 should be located at a level below battery 10.

In the embodiment of Figs. 1 and 2, a deflagrating or "low" explosive such as the well known black powder may be used in place of the nitrocellulose 18. Such a deflagrating composition burns progressively and not explosively and does not cause damage to the battery structure. With such a material as granular black powder, the envelope 19 is composed of a porous textile gauze.

Figure 3:
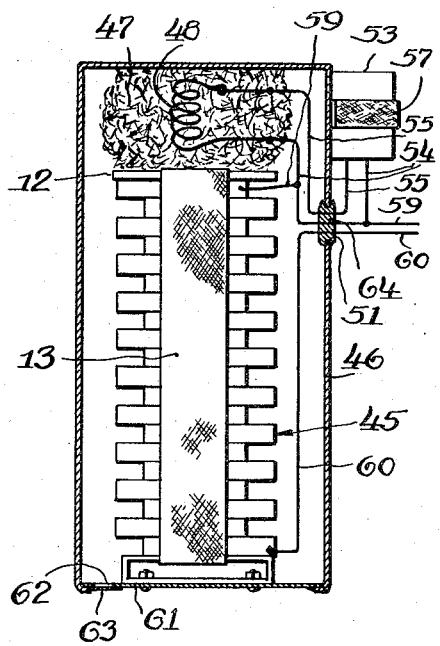
Fig. 3 is a view similar to Fig. 1 of a different embodiment of the invention.

The embodiment shown in Fig. 3 is similar to that of Figs. 1 and 2 with the difference that means are provided for automatically energizing the heating coil upon immersion of the battery in the body of activating liquid, and a different combustible material is used. Deferred action battery 45 is mounted in container 46 in the same manner as battery 10 is mounted in container 31 in the device of Figs. 1 and 2. A mass 47 of a combustible material such as fibrous cotton, shredded aluminum, shredded magnesium, or the like rests upon the top of battery 45, and heating coil 48 is embedded in the mass and is adapted to ignite the material 47 upon energization by the expendable deferred action battery 53. The output terminals of the expendable battery 53 are connected by conductors 54 and 55 to the heating coil 47, said conductors passing through opening 51 in the side wall of container 46. Battery 53 is mounted upon the upper portion of the exterior of container 45 by the adhesive tape 57 which is attached to the surfaces of the battery and the container and binds the two firmly together. Expendable battery 53 may be of any suitable construction which will deliver high current at low voltage. A suitable battery is that which is described with respect to Figs. 3 and 4 of U. S. Patent 2,428,850. Said battery contains a single cell having an anode of magnesium and a depolarizing cathode of a water-insoluble silver halide such as silver chloride, said electrodes being of large area and in close proximity to each other. Such a deferred-action battery is adapted for activation by plain water or the salt water of the ocean and is capable of delivering large current at low voltage upon contact with the activating liquid. The output terminals of the main battery 45 are connected to conductors 59 and 60 which pass through opening 51 in container 45 and are adapted to be connected to a load circuit. As in the embodiment of Figs. 1 and 2, the bottom 61 of container 46 has opening 62 therein, which is covered with the rupturable diaphragm 63.

In assembling the embodiment of Fig. 3, the assembly of battery 45, combustible mass 47 and heating coil 48 is mounted on bottom cover 61 and then said assembly and cover 61 are inserted in position while conductors 54, 55, 59 and 60 are led through opening 51. Thereafter, cover 61 is attached to container 46, opening 51 is sealed with sealing composition 64 and terminals 54 and 55 are connected to battery 53.

The combustible material 47 does not contain oxygen and gaseous oxygen is introduced into container 45. In this embodiment, cover 61 is attached to container 46 before diaphragm 63 is applied over opening 62. Prior to applying diaphragm 63, air is evacuated from container 46 through opening 62 by suitable means as an evacuating pump, oxygen is introduced through said opening, and diaphragm 63 is then applied.

When it is desired to place battery 45 in operation, the output conductors 59 and 60 are connected to the apparatus which it is desired to be operated by battery 45 and the assembly shown in Fig. 3 is immersed in a body of activating liquid, as by dropping said assembly into the sea from an airplane. Floating apparatus (not shown) is usually employed as has been described hereinbefore, and immersion is sufficient that at least a portion of battery 53 is immersed. This construction is especially adapted for use with sonobuoy apparatus which is dropped into the water, usually from an airplane, and then floats with the container 46 submerged. Battery 53 is thereby activated and energizes heating coil 48 which ignites the combustible material 47. Combustion of the latter is supported by the oxygen which has been introduced into container 46. Thereupon activation of battery 45 takes place in the manner described heretofore in connection with the embodiment of Figs. 1 and 2. The expendable battery 53 is so constructed that after the combustible material 47 has been ignited the active elements of the battery are consumed and the battery ceases to delivery energy. The embodiment of Fig. 3 therefore, provides automatic activation, and all that is required is that it be submerged in a body of activating liquid whereupon activation and operation follow automatically and in the same manner as described in connection with the embodiment of Figs. 1 and 2. During operation, gases are generated by the battery, which gases expel activating liquid from the interior of container 46 and prevent short circuits between the cells of the battery during their discharge, as has been described in connection with the embodiment of Fig. 1.

As a modification of the embodiment described in connection with Fig. 3, a gaseous combustible composition may be used as the combustible substance instead of a solid composition. For example, a mixture of hydrogen and oxygen may be used, in which case the diaphragm 63 is omitted until after the assembly is complete, and then the container 46 is first evacuated by means of a suitable evacuating apparatus such as an air pump, and then filled with the combustible mixture of hydrogen and oxygen, whereupon the rupturable diaphragm 63 is applied to the cover 61. In this embodiment, all structure is the same as that of Fig. 3 except for the substitution of the gaseous combustible mixture of hydrogen and oxygen for the solid composition 47. The heating coil 48 serves to ignite the gaseous mixture, and the activating operation is similar to that which has been described in connection with the embodiment of Fig. 3. The mixture of hydrogen and oxygen is converted at least in part to water, that is, to the liquid state. If stoichiometric proportions of hydrogen and oxygen are used, the mixture is substantially all converted to water. Such conversion from the gaseous to the non-gaseous state results in contraction of volume of gas in the container and rapid inflow of activating liquid.

Figure 4:
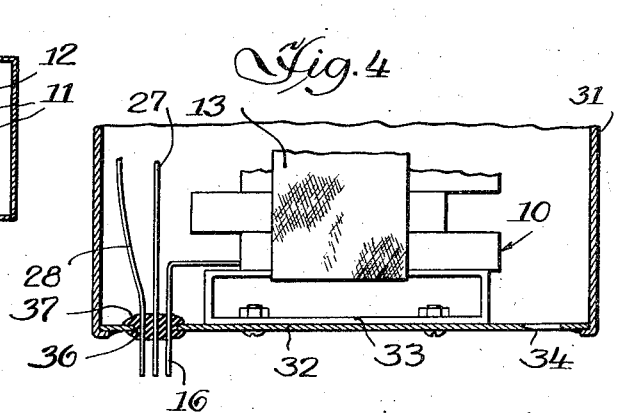
Fig. 4 is a fragmental vertical sectional view of a further embodiment of the invention.

The embodiment illustrated in Fig. 4 is similar to that of Figs. 1 and 2 with the difference that the rupturable diaphragm 35 is omitted. It is adapted for use with a combustible substance which does not require a gas, such as the nitrocellulose or black powder described hereinbefore. In this embodiment, when it is desired to activate the battery 10, the container 31 is submerged in the activating liquid to the point where opening 34 is submerged, and battery 40 is connected to heating coil 23 to ignite combustible material 18. Preferably, container 31 is submerged only slightly so that a large amount of activating liquid will not well up in the container through opening 34 prior to the activating operation. Upon combustion of material 18, the major portion of the liquid and hot gases in the container are expelled through opening 34. Upon completion of combustion, the gases remaining in the container cool and contract whereby the interior of the container and the interiors of the cells of battery 10 are partially evacuated, activating liquid is drawn quickly into the container and the interior of the cells, and thereafter during discharge gases are generated by battery 10 and activating liquid is expelled from the container and short circuits are inhibited, all as described hereinbefore.

While three embodiments have been specifically described herein, these are by way of illustration only and variations thereof within the spirit of the invention will occur to those skilled in the art.

Invention is claimed as follows:

1. A quick-activating deferred-action battery structure for activation on contact with a body of activating liquid, comprising a deferred-action battery having a plurality of cells, a container enclosing said battery, the interior of the cells of said battery being open to and in communication with the interior of said container, a rapidly combustible material positioned within said container to cause the evacuation of gasses therefrom upon combustion, means for initiating combustion of said material, and means for providing communication between the interior of said container and a body of activating liquid in contact with said container, whereby upon combustion of said combustible material the interiors of said container and cells are evacuated and activating liquid is thereafter drawn therein.

2. A battery structure according to claim 1 wherein the rapidly combustible material is located in the top portion of the container above the battery, and means for providing communication between the interior of said container and a body of activating liquid in contact with said container is located in the bottom portion of said container.

3. A battery structure according to claim 1 wherein the rapidly combustible material comprises an interstitial mass of a readily combustible solid.

4. A battery structure according to claim 1 wherein the means for initiating combustion comprises an electric heating coil adapted to be actuated by a source of electricity separate from the battery within the container.

5. A battery structure according to claim 1 wherein the means for initiating combustion comprises an electric coil, and supported upon said container exteriorly thereof, and adapted to be activated upon immersion in an activating liquid.

6. A battery structure according to claim 1 wherein the rapidly combustible material is a solid and the gases within the container are enriched with oxygen to promote rapid combustion of said solid material.

7. A quick-activating deferred-action battery structure for activation on contact with a body of activating liquid, comprising a deferred-action battery having a plurality of cells, a substantially water-tight and gas-tight container enclosing said battery, the walls of said container having a rupturable portion, the interior of the cells of said battery being open to and in communication with the interior of said container, a rapidly combustible material positioned within said container to cause the evacuation of gases therefrom upon combustion, and means for initiating combustion of said material, whereby upon combustion of said material the rupturable portion of said container is ruptured, the interiors of said container and cells are evacuated, and activating liquid is thereafter drawn into said container and battery.

8. A quick-activating deferred-action battery structure according to claim 7 wherein the rupturable portion of said container is located in the body thereof.

References Cited in the file of this patent

UNITED STATES PATENTS

| | | |
|---|---|---|
| 2,594,879 | Davis | Apr. 29, 1952 |
| 2,637,756 | Coleman et al. | May 5, 1953 |

FOREIGN PATENTS

| | | |
|---|---|---|
| 17,269 | Great Britain | of 1895 |